United States Patent [19]

Hara et al.

[11] Patent Number: 4,923,943

[45] Date of Patent: May 8, 1990

[54] METATHESIS POLYMERIZED COPOLYMER

[75] Inventors: Shigeyoshi Hara; Zen-ichiro Endo, both of Iwakuni, Japan

[73] Assignee: Hercules Incorporated, Wilmington, Del.

[21] Appl. No.: 168,045

[22] Filed: Mar. 14, 1988

[30] Foreign Application Priority Data

Mar. 13, 1987 [JP] Japan .................................. 62-56913

[51] Int. Cl.$^5$ ............................................. C08F 32/00
[52] U.S. Cl. .................................................... 526/283
[58] Field of Search ........................................ 526/283

[56] References Cited

U.S. PATENT DOCUMENTS

| | | |
|---|---|---|
| 3,789,042 | 1/1974 | Colomb et al. . |
| 4,380,617 | 4/1983 | Minchak . |
| 4,400,340 | 8/1983 | Klosiewicz . |
| 4,418,178 | 11/1983 | DeWitt . |
| 4,418,179 | 11/1983 | DeWitt et al. . |
| 4,426,502 | 1/1984 | Minchak . |
| 4,426,506 | 1/1984 | Blanco . |
| 4,436,858 | 3/1984 | Klosiewicz . |
| 4,458,037 | 7/1984 | Leach . |
| 4,469,809 | 9/1984 | Klosiewicz . |
| 4,481,344 | 11/1984 | Newburg . |
| 4,485,208 | 11/1984 | Klosiewicz . |
| 4,496,668 | 1/1985 | Newburg . |
| 4,496,669 | 1/1985 | Leach . |
| 4,507,453 | 3/1985 | Tom . |
| 4,520,181 | 5/1985 | Klosiewicz . |
| 4,535,097 | 8/1985 | Newburg . |
| 4,598,102 | 7/1986 | Leach . |
| 4,604,408 | 6/1985 | Newburg . |
| 4,604,447 | 8/1986 | Malpass . |
| 4,607,077 | 8/1986 | Silver et al. . |
| 4,657,981 | 4/1987 | Klosiewicz . |
| 4,661,575 | 4/1987 | Tom . |
| 4,689,380 | 8/1987 | Nahm .................................. 526/283 |
| 4,703,098 | 10/1987 | Matlack . |

FOREIGN PATENT DOCUMENTS

| | | |
|---|---|---|
| 0084888 | 8/1983 | European Pat. Off. . |
| 0096877 | 12/1983 | European Pat. Off. . |
| 0181640 | 5/1986 | European Pat. Off. . |
| 53-24400 | 3/1978 | Japan . |
| 61-293208 | 12/1986 | Japan . |

*Primary Examiner*—Joseph L. Schofer
*Assistant Examiner*—Alex H. Walker
*Attorney, Agent, or Firm*—William S. Alexander

[57] ABSTRACT

A cross-linked copolymer comprising repeating units derived from a mixture comprising metathesis polymerizable cyclic compounds such as dicyclopentadiene and carboxylic acid esters of which the acid residue and alcohol residue have individually at least one norbornene-moiety, a process for producing the copolymer, a process for producing a molded article from the copolymer and a polymerizable composition therefor.

17 Claims, No Drawings

METATHESIS POLYMERIZED COPOLYMER

FIELD OF THE INVENTION

This invention relates to a metathesis polymerized cross-linked copolymer, a process for producing the copolymer, a process for producing a molded article from the copolymer, a polymerizable composition used for producing the copolymer and the molded article and a molded article produced from the copolymer.

BACKGROUND OF THE INVENTION

U.S. Pat. No. 4,400,340 and U.S. Pat. No. 4,426,502 disclose the production of a molded article by injecting a reactive liquid mixture comprising norbornene-type monomer such as dicyclopentadiene (called "DCP" hereinafter) and a metathesis polymerization catalyst system into a mold in which said liquid mixture is metathesis polymerized in bulk (called "RIM process" hereinafter). RIM process is a low pressure one step or one-shot injection of a liquid mixture into a closed mold where rapid polymerization occurs resulting in a molded article. Thus, there are easily produced large-sized molded articles from DCP and the like by RIM process. The molded articles have been taken notice from the industrial point of view since they have attractive physical properties as balanced in stiffness and impact resistance. However, the molded articles produced from DCP by said RIM process have low softening points generally below 120° C., and this often limits the use of the molded articles produced from DCP, etc.

Further, the metathesis polymerization catalyst system used in RIM process comprises a catalyst component comprising a compound of a transition metal such as tungsten, molybdenum, rhenium or tantalium and an activator component comprising an organic metal compound of aluminum, tin or the like. The metathesis polymerization catalyst system initiates the polymerization reaction upon mixing of the catalyst component and the activator component. RIM process utilizes advantageously characteristics of the metathesis polymerization catalyst system, and therein there is produced a molded article by mixing the first reactive solution containing the catalyst component and a monomer such as DCP and the second reactive solution containing the activator component and the monomer and then immediately injecting the mixture into a mold.

However, both of the catalyst component and the activator component of said catalyst system are too active for polymerizing a cycloolefin such as DCP in bulk even at room temperature, and thus the polymerization of DCP and the like often occurs before poured into a mold, and it makes the pouring of the mixture into the mold difficult.

Therefore, it is desirable to moderate the metathesis polymerization reaction as to provide an adequate induction period.

Said U.S. Pat. No. 4,400,340 discloses using Lewis-bases to moderate the polymerization reaction of RIM process. However, Lewis-bases remaining in the polymer injure molded polymer articles and often produce undesired volatile compounds.

Said U.S. Pat. No. 4,426,502 is characterized by the use of a particular metathesis polymerization catalyst system to moderate the polymerization reaction of RIM process. However, this requires the inconvenient limited selection of the metathesis polymerization catalyst system.

Recently, there has been produced a molded article by so-called "pre-mix process" which comprises mixing a metathesis polymerization catalyst system and a monomer such as DCP to prepare a pre-mixture with a static mixer and the like instead of a impingement mixer in case of RIM and then introducing the pre-mixture into a mold.

A molded article can be produced more easily by pre-mix process than by RIM process, since pre-mix process requires simpler molding devices than in RIM process. However, pre-mix process necessitates the more effective moderation of the metathesis polymerization reaction than RIM process.

Further, Japanese Patent Laid Open Sho 61-179214 discloses that there are produced copolymers having relatively high glass transition temperatures by the metathesis copolymerization of norbornene-type cycloolefins such as DCP with other metathesis polymerizable norbornene-type comonomers having a polar group on 5-position of norbornene-moiety and that said other metathesis polymerizable comonomers can moderate the metathesis polymerization reaction.

The above Japanese patent publication discloses that some of carboxylic acid esters containing two norbornene-moieties can be used as a comonomer with DCP. The esters disclosed therein are those of which two mono-carboxylic acid residues have individually one norbornene-moiety but the glycol residue does not have the norbornene-moiety, such as ethylene bis(5-norbornenylcarboxylate), or those of which two mono-alcohol residues have individually one norbornene-moiety but the dicarboxylic acid residue does not have the norbornene-moiety, such as bis(5-norbornenyl-methyl)phthalate.

In said Japanese patent publication, however, it is rather difficult to obtain said esters in a pure form because of rather high molecular weight of the esters. Further, the attained increase of glass transition temperature of the polymers is at most about 50° C. and is not enough.

Now, we have found that particular metathesis polymerizable carboxylic acid esters of which the acid residue and alcohol residue have individually at least one norbornene-moiety are easy to prepare and can moderate very effectively the metathesis polymerization reaction of DCP and the like. Thus, it is very advantageous to use said carboxylic acid esters in the above mentioned RIM-process and pre-mix process.

Further, we have found that there can be produced highly cross-linked heat resistant copolymers having a very high softening point by copolymerization of the metathesis polymerizable cycloolefins such as DCP with the metathesis polymerizable carboxylic acid esters.

Therefore, it is an object of the present invention to provide cross-linked heat resistant metathesis polymerized copolymers having a very high softening point.

A further object of the present invention is to provide a process for producing said copolymers under a moderated reaction condition.

Another objects of the present invention is to provide a process for producing molded articles comprising the copolymers. A further object of the present invention is to provide polymerizable composition used for producing said copolymers and molded articles. Another object is to provide molded articles.

SUMMARY OF THE INVENTION

The present invention relates to a metathesis polymerized cross-linked copolymer comprising:

(a) 50-99 mole % of repeating units derived from at least one of metathesis polymerizable cyclic compounds containing at least 30 mole %, based on total moles of the metathesis polymerizable cyclic compounds, of dicyclopentadiene (DCP), and (b) 50-1 mole % of repeating units derived from at least one of carboxylic acid esters of which the acid residue and alcohol residue have individually at least one norbornene-moiety.

Further, the present invention relates to a process for producing said metathesis polymerized crosslinked copolymer by metathesis polymerizing, in the presence of a metathesis polymerization catalyst system, a mixture comprising:

(a) 50-99 mole % of at least one of metathesis polymerizable cyclic compounds containing at least 30 mole %, based on total moles of the metathesis polymerizable cyclic compounds, of dicyclopentadiene, and (b) 50-1 mole % of at least one of carboxylic acid esters of which the acid residue and alcohol residue have individually at least one norbornene-moiety.

In addition, the present invention relates to a process for producing a molded article by introducing a reactive liquid mixture which comprises said mixture comprising (a) and (b) and the metathesis polymerization catalyst system into a mold in which said liquid mixture is metathesis polymerized in bulk to produce the molded article and relates to a molded article produced by the process.

The present invention further relates to a multi-part polymerizable composition comprising metathesis polymerizable monomers and the metathesis polymerization catalyst system, in which said metathesis polymerizable monomers comprising said (a) and (b) and said metathesis polymerization catalyst system comprising a catalyst component and an activator component which are nor present in the same part.

DETAILED DESCRIPTION OF THE INVENTION

In the present invention, the metathesis polymerizable cyclic compounds (a) contain at least 30 mole %, preferably 50 mole %, more preferably 80 mole %, based on total moles of the metathesis polymerizable cyclic compounds (a), of DCP.

It is preferred that DCP is of a high purity of at least 95 %, more preferably at least 97 %. When impurities are unavoidable, they should be those which do not inhibit the metathesis polymerization reaction, and they are preferably metathesis polymerizable. It is preferred that the content of polar compounds which inhibit the metathesis polymerization reaction, such as alcohols, carboxylic acids and carbonyl compounds, is as low as possible.

In the present invention, the metathesis polymerizable cyclic compounds (a) may also contain up to 70 mole %, based on total moles of the metathesis polymerizable cyclic compounds (a), of at least one of metathesis polymerizable cyclic compounds other than DCP. From the aspect of metathesis polymerizability, cyclic compounds having at least one norbornene moiety are preferable. Examples of them include norbornene, 5-cyclohexenyl-norbornene, 5-methylnorbornene, 5-ethylnorbornene, 5-butylnorbornene, 5-vinylnorbornene, 5-ethylidenenorbornene, 5-isopropenylnorbornene, 5-isopropyridenenorbornene, cyclopentadiene-methylcyclopentadiene-codimer, 5-phenylnorbornene, 1,4,5,8-dimethano-1,4,4a,5,8,8a-hexahydronaphthalene, 6-ethylidene-1,4,5,8-dimethano-1,4,4a,5,7,8,8a-heptahydronaphthalene, tri-cyclo[8,2,1,0]trideca-5,11-diene, 1,4,5,8-dimethano-1,4,4a,5,6,7,8,8a-octahydronaphthalene, 6-methyl-1,4,5,8-dimethano-1,4,4a,5,6,7,8,8a-octahydronaphthalene, oligocyclopentadiene such as tricyclopentadiene and the like.

As the metathesis polymerizable cyclic compounds (a) other than DCP, there may also be used those having at least one of hereto atom such as oxygen, nitrogen and the like together with metathesis polymerizable cycloalkene moiety, preferably norbornene moiety.

The hetero atom forms a polar group in the structure of said cyclic compounds, and the polar group often can moderate the metathesis polymerization reaction as well as the carboxylic acid esters (b).

Examples of the polar groups having such moderation effect preferably include ether groups, carboxylic ester groups, cyano group, N-substituted imido groups and the like.

Examples of the cyclic compounds having the polar groups include [(5-norbornenyl)-methyl]phenyl ether, bis[(5-norbornenyl)-methyl]ether, 5-methoxycarbonyl-norbornene, 5-methoxycarbonyl-5-methylnorbornene, 5-[(2-ethylhexyloxy)carbonyl]norbornene, ethylene-bis(5-norbornenecarboxylate), 5-cyanonorbornene, 6-cyano-1,4,5,8-dimethano1,4,4a,5,6,7,8,8a-octahydronaphthalene, N-butylnadic acid imide, 5-(4-pyridyl)-norbornene and the like.

Among the examples, 5-methoxycarbonylnorbornene, 5-methoxycarbonyl-5-methylnorbornene, dimethylnadicate, 5-acetoxynorbornene, 5-acetoxymethylnorbornene, and 6-methoxy-carbonyl-1,4,4a,5,6,7,8,8a-octahydronaphthalene are preferred since they are starting materials, intermediate or by-product in the preparation of the carboxylic acid esters (b) mentioned below.

In the present invention, as the carboxylic acid esters (b), there can be used any of carboxylic acid esters of which the acid residue and alcohol residue have individually at least one norbornene-moiety (called "Norbornene-Ester" hereinafter).

As Norbornene-Ester, however, there are preferably used those having a melting point below 80° C., preferably below 50° C., more preferably below 35° C.

Norbornene-Ester can be produced according to various processes including the following processes (A) and (B):

(A) A process in which a carboxylic acid ester, of which the acid residue and alcohol redidue have individually a carbon-carbon double bond is reacted with a cyclopentadiene-moiety containing compound according to Diels-Alder addition reaction.

(B) A process in which a carboxylic acid having norbornene-moiety or its reactive derivative is reacted with an alcohol having norbornene-moiety or its reactive derivative.

In the process (B), the carboxylic acid having norbornene-moiety and alcohol having norbornene-moiety are generally produced by reacting carboxylic acid having carbon-carbon double bond and alcohol having carbon-carbon double bond with cyclopentadiene according to Diels-Alder addition reaction, respectively. Therefore, the process (B) is more complicated than the process (A), but can produce purer Norbornene-Ester. On the other hand, the process (A) is more economical since it can use commercially available esters of which the acid residue and alcohol residue have individually carbon-carbon double bond, such as diallyl maleate, allyl methacrylate and allyl acrylate, as a starting material. But, during Diels-Alder reaction of such esters with cyclopentadiene moiety, various by-products may be formed. This leads to difficulties in purification of the reaction products. However, if such by-products are metathesis-polymerizable, they can be used as comonomer components without being removed from the product.

Preferred examples of Norbornene-Ester include, (5-norbornenyl)methyl-5'-norbornenylcarboxylate (5-norbornenyl)methyl-5'-norbornenylcarboxylate

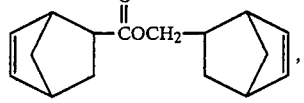

(5-norbornenyl)methyl-5'-(5'-methyl-norbornenylcarboxylate)

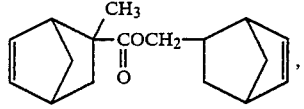

bis[5-norbornenyl)methyl]nadicate

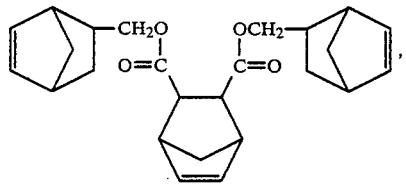

5-norbornenyl-5'-norbornenylcarboxylate

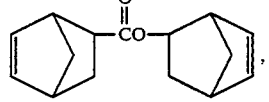

(5-norbornenyl)methyl-1,4,5,8-dimethano-1,4,4a,5,6,7,8,8a-octahydronaphthalene-6-carboxylate

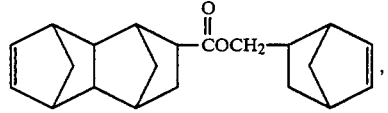

and the like.

Norbornene-Ester used in the present invention should be of high purity. The activity of the metathesis polymerization catalyst system is often reduced by some of the carboxylic acids or its reactive derivatives and alcohols or its reactive derivatives, which are starting materials for producing Norbornene-Ester, and hydrolyzates of Norbornene-Ester, and these impurities should be removed from Norbornene-Ester.

In the present invention, there are used 50–99 mole % of at least one of the metathesis polymerizable cyclic compounds (a) and 50–1 mole % of the carboxylic acid esters (b), i.e. Norbornene-Ester, both of said mole % being based on total moles of the cyclic compounds (a) and the carboxylic acid esters (b).

The amounts of the cyclic compounds (a) and Norbornene-Ester can be varied freely within ranges of said mole % depending on properties required for the copolymers, e.g. heat resistance, mechanical strength, etc. and depending on required degrees of moderation of the metathesis polymerization reaction. In general, however, there are preferably used 65–97 mole % of the cyclic compounds (a), especially DCP, and 35–3 mole % of Norbornene-Ester from the view points of easy handling and economy.

In the present invention, the metathesis copolymerization of the cyclic compounds (a), especially DCP, with Norbornene-Ester provides highly cross-linked heat resistant copolymers and molded articles having a very high softening point, usually of above 150° C., and increased mechanical strength, and the copolymers and molded articles are very advantageous to many uses. In the present invention, further, the use of Norbornene-Ester provides mild moderation of the metathesis polymerization of DCP and the like to attain prolonged polymerization time and easy handling.

In general, as well known, the metathesis polymerization catalyst system is composed of two components, i.e. a main catalyst component and an activator component. In the practice of bulk polymerization in the presence of the metathesis polymerization catalyst system, the activator component is first added to the monomer mixture and then the principal catalyst component is added to the mixture to initiate polymerization and finally the mixture is molded before solidified to produce a cross-linked molded articles. Alternatively, the principal catalyst component and the activator component can be added to the monomer mixture in reversed order. Further, the principal catalyst component and the activator component are simultaneously added to the monomer mixture immediately before pouring the mixture into the mold and molded articles are prepared in the same manner as the above.

The metathesis polymerization reaction, however is an exothermal reaction and proceeds very rapidly. Under such situation, the polymerization often occurs before the mixture is poured into a mold, and it makes the pouring of the mixture into the mold difficult and makes the production of large sized molded articles difficult.

Accordingly, it is desirable to use a method in which the original reactive monomer solutions to be poured into the mold are separated into multi-part reactive solutions, that is, the catalyst and the activator of the metathesis polymerization catalyst system are added to individual monomer liquids to form multi-part reactive solutions, and then the multi-part reactive solutions are mixed rapidly by means of impingement-mixing (the RIM process) or by using a static mixer, and finally the mixture is immediately poured into a mold wherein it is polymerized and molded.

In this method, the multi-part reactive solutions do not need to have the same proportion of monomers each other. The proportion of the monomers may be changed freely provided that the whole proportion of the monomers is kept within the above-mentioned range. That is, the reactive solution containing the activator component may contain larger amount of Norbornene-Ester than the reactive solution containing the catalyst component or vice versa.

As the catalyst component of the metathesis polymerization catalyst system are used salts such as halides of tungsten, molybdenum, rhenium or tantalium, preferably, tungsten and molybdenum. Particularly preferable are the tungsten compounds. Among tungsten compounds are preferred tungsten halides, tungsten oxyhalides and the like. More particularly, tungsten hexachloride and tungsten oxychloride are preferred. Organo ammonium tungstate may also be used. However, such halogen-containing tungsten compounds undesirably often initiate cationic polymerization immediately when added directly to the mixture of monomers. It is, therefore, preferable that they are previously suspended in an inert solvent such as, for example, benzene, toluene or chlorobenzene and solubilized by the addition of an alcoholic compound or a phenolic compound.

A chelating agent or a Lewis base is preferably added to the solution containing the tungsten compound in order to prevent undesirable polymerization. Those additives may include acetylacetone, acetoacetic acid, alkyl esters, tetrahydrofuran, benzonitrile and the like. About 1-5 moles of a chelating agent or the Lewis base is preferably used per one mole of the tungsten compound. However, Norbornene-Ester used in the present invention itself is a Lewis base and usually can moderate the metathesis polymerization reaction, and the addition of the chelating agent or the Lewis base can be omitted. Under such situations, the reactive solution containing the monomers and the catalyst component of the metathesis polymerization catalyst system is kept stable sufficiently for practical use.

The activator components of the metathesis polymerization catalyst system include organic metal compounds such as alkylated products of metals of Group I–Group III in the Periodic Table, preferably, tetraalkyl tins, alkylaluminum compounds and alkylaluminum halide compounds including diethylaluminum chloride, ethylaluminum dichloride, trioctylaluminum, dioctylaluminum iodide, tetrabutyltin and the like. The activator component is dissolved in a mixture of monomers to form the other reactive solution.

According to the present invention, in principle the molded articles are produced by mixing said two reactive solutions as already described above. The polymerization reaction, however, starts so rapidly when the above-mentioned composition is used, and so the undesirable initiation of polymerization often accompanied by partial gelling occurs before completion of filling of the mixed solution into the mold. In order to overcome the problem, it is preferable to use a polymerization moderating agent.

As such moderators are generally used Lewis bases, particularly, ethers, esters, nitriles and the like.

Examples of the moderators include ethylbenzoate, butyl ether, diglyme, diethyleneglycoldibutylether, benzonitrile and the like. Such moderators are generally added to the reactive solution containing the activator component.

When a tungsten compound is used as the catalyst component, the ratio of the tungsten compound to the above-mentioned monomers is about 1000:1–about 15000:1, and preferably about 2000:1 on molar base. When an alkylaluminum compound is used as the activator component, the ratio of the aluminum compound to the above-mentioned monomers is about 100:1–about 2000:1 and preferably around a ratio of about 200:1–about 500:1 on molar base. The amount of the masking agent or the moderator may be adjusted by experiments depending upon the amount of the catalyst system.

A variety of additives may be used practically in the present invention to improve or to maintain characteristics of the molded articles. The additives include fillers, reinforcing agents, pigments, antioxidants, light stabilizers, macromolecular modifiers, flame retardants and the like. These additives must be added to the starting solutions, since they cannot be added after the solutions are polymerized to the solid molded polymer.

They may be added to either one or both of multi-part reactive solutions. The additives must be ones being substantially unreactive with the highly reactive catalyst or activator component in the solution to avoid troubles as well as not to inhibit polymerization.

If a reaction between the additive and the catalyst is unavoidable but does not proceed so rapidly, the additives can be mixed with the monomers to prepare a third solution, and the third solution is mixed with the first and/or second solutions of the multi-part solutions immediately before pouring the mixture into a mold. When the additive is a solid filler, a reactive solution containing the filler suspended in it can be used. Instead, the mold can be filled with the filler prior to pouring the reactive solutions into the mold.

The reinforcing agents and fillers can improve flexural modulus of the polymer. They include glass fibers, mica, carbon black, wollastonite and the like. The fillers whose surfaces are treated with silane coupling agent may preferably be used.

The molded articles of the invention may preferably contain an antioxidant. Preferably, a phenol- or amine-antioxidant is added in advance to the polymerizable solution. Examples of the antioxidants include 2,6-t-butyl-p-cresol, N,N'-diphenyl-p-phenylenediamine, tetrakis-[methylene(3,5-di-t-butyl-4-hydroxycinnamate))methane, methylene-4,4'-bis(3,5-di-t-butylphenol) and the like.

The polymer molded articles of the invention may also contain other polymers, which are added to the monomer solution. Among polymers, elastomers are more preferable since they increase the impact strength of the molded articles and they effectively control the viscosity of the solution. Examples of the elastomers include styrenebutadiene rubber, polybutadiene, styrene-butadiene-styrene triblock rubber, styrene-isoprene-styrene triblock rubber, polyisoprene, butyl rubber, ethylene-propylene rubber, ethylene-propylene-diene terpolymers, nitrile rubber and the like.

As described above, the polymer molded articles of the invention are preferably prepared by simultaneous molding with polymerizing, i.e. by RIM process or pre-mix process including RTM and RI process. In RIM process, two-part monomer solutions containing the catalyst and the activator respectively are rapidly mixed in the mixing head of a RIM instrument and the mixture is poured into a mold wherein it polymerizes and is molded.

In pre-mix process, two-part monomer solutions containing the catalyst component and the activator component respectively are previously mixed to prepare a pre-mixture and then the pre-mixture is introduced into a mold. In the pre-mix process, fillers such as glass fibers may be placed in the mold prior to pouring the pre-mixture, or may be added in the pre-mixture.

In both of RIM process and pre-mix process, the mixture can be introduced into the mold under relatively low pressure so that an inexpensive mold is usable. The temperature inside the mold increases rapidly by heat of the polymerization reaction so that the polymerization reaction is completed in a short time. The molded article of the invention can be removed easily from the mold without a releasing agent unlike the polyurethane-RIM process.

The surface of the molded articles of the invention has polarity probably by the oxidized layer formed on the surface so that conventional coatings such as epoxy, polyurethane and the like adhere to the surface well.

The present invention provides a variety of molded articles which include large sized molded articles such as parts of various vehicles including automobiles, motorbikes, motorboats, snowmobiles, etc. and housing of electric and electronic instruments and the like.

As mentioned above, the molded articles produced by the present invention have a very high softening point and are highly heat resistant, and are practically usable in many fields.

The present invention described herein is illustrated by the following examples. These examples do not limit the invention.

EXAMPLES 1–4 AND COMPARATIVE EXAMPLES 1–2

Preparation of monomers 156.5g Of 5-norbornene-2-carbonylchloride and 124 g of 5-hydroxymethylnorbornene and 12 g of pyridine were charged into a 500 ml reaction vessel and then were reacted at 16°–30° C. for 8 hours. The product was purified by distillation. There was produced 197 g of [(5-norbornenyl)methyl]-5′-norbornenylcarboxylate (called "NNC" hereinafter) having a boiling point of 110°–120° C./1 mmHg.

170.5 g Of 5-norbornene-2-methyl-2-carbonyl-chloride and 124 g of 5-hydroxymethylnorbornene and 12 g of pyridine were charged into a 500 ml reaction vessel and then were reacted at 20°–30° C. for 8 hours. The product was purified by distillation. There was produced 201 g of [(5-norbornenyl)methyl]-5′-(5′-methylnorbornenyl)carboxylate having a boiling point of 125°–133° C/1 mmHg (called "NMC" hereinafter).

Preparation of mixed monomer solutions

Commercially available dicyclopentadiene (DCP) was purified by distillation under nitrogen and reduced pressure to produce purified DCP with a freezing point of 33.4° C. The purity was determined by gas-chromatography to be not less than 99%.

DCP, one of NNC and NMC and occasionally 5-ethylidene-norbornene (called "ENB" hereinafter) were mixed in mole % shown in Table 1 below to prepare mixed monomer solutions.

Preparation of solutions containing the catalyst 20 g Of tungsten hexachloride was added to 70 ml of anhydrous toluene under nitrogen and then a solution consisting of 21 g of nonylphenol and 16 ml of toluene was added to prepare a catalyst solution containing 0.5 M tungsten in terms of the metal content. The solution was purged with nitrogen overnight to remove hydrogen chloride gas formed by the reaction of tungsten hexachloride with nonylphenol. The resulting solution was used as a catalyst solution for polymerization.

With 10 ml of the above catalyst solution were mixed 1.0 ml of acetylacetone and 500 ml of each of the mixed monomer solutions shown in Table 1 to prepare the first reactive solution (Solution A) containing 0.001 M tungsten in terms of the metal content.

Preparation of solutions containing activator

Trioctylaluminum, dioctylaluminum iodide and diglyme were mixed in the molar ratio of 85:15:300 to prepare an activator solution. The activator solution was mixed with 500 ml of each of the mixed monomer solutions shown in Table 1 to prepare the second reactive solution (Solution B) containing 0.003 M aluminum in terms of the metal content.

Production of polymers and molded articles

Each of 10 ml of Solution A and 10 ml of Solution B was introduced into two syringes respectively after being kept at a given temperature shown in Table 1 below and thoroughly purged with nitrogen. The solutions in each syringe were rapidly introduced into a glass-flask equipped with a stirrer and were mixed rapidly. Then, the stirrer was removed and a thermo-couple was inserted. There was measured the time at which the reaction mixture reached at 100° C. after the introduction from the syringes (called "polymerization time" hereinafter).

There was produced each of cross-linked molded articles, and it was cut into test pieces. The softening point of each test piece was measured according to the TMA method.

Results are shown in Table 1 below.

TABLE 1

|  | Example No. | | | | Compar. Example No. | |
| --- | --- | --- | --- | --- | --- | --- |
|  | 1 | 2 | 3 | 4 | 1 | 2 |
| Monomers in the mixed monomers solutions (mole %) | | | | | | |
| DCP | 90 | 85 | 70 | 90 | 100 | 95 |
| NNC | 10 | 10 | 30 | — | — | — |
| NMC | — | — | — | 10 | — | — |
| ENB | — | 5 | — | — | — | 5 |
| Initial temp. when mixed (°C.) | 70 | 70 | 80 | 70 | 35 | 35 |
| Polymerization time reaching 100° C. (sec.) | 64 | 60 | 75 | 66 | 22 | 20 |
| TMA softening point (°C.) | 157 | 155 | 171 | 158 | 92 | 90 |

Table 1 shows that the copolymerization of DCP with relatively small amount of NNC or NMC provides the polymers and molded articles with highly rised softening points of above 150° C. Table 1 shows further that the use of NNC or NMC with DCP moderates the metathesis polymerization reaction and prolongs the polymerization time. This means that NNC and NMC make the molding process more easy.

Each of 10 ml of Solution A and 10 ml of Solution B of Example 1 was introduced into two syringes respectively kept at 25° C. and thoroughly purged with nitrogen. The solutions in each syringe were injected at a constant rate into a mold of a miniature-sized RIM instrument in which nozzle the solutions were mixed. A very strong brown plate was produced.

5 ml Of Solution A and 5 ml of Solution B of Example 3 was mixed and stirred under nitrogen stream to prepare a pre-mixture, and then the pre-mixture was cast into a mold maintained at 90° C. A very strong brown molded plate was produced.

EXAMPLES 5–7

Preparation of 5-norbornenyl-5′-norbornenylcarboxylate

Commercially available vinylacrylate and dicyclopentadiene were reacted at equimole ratio in an autoclave at 190° C. for 10 hours. The resultant mixture was fractionally distilled. The distillate collected at 95°–98° C. under 0.5 mmHg was purified by passing through alumina column. A portion which has m.p. of 45°–47° C. was identified as 5-norbornenyl-5'-norbornenylcarboxylate by Infrared Spectrum, NMR and Mass-spectrogram.

Preparation of cross-linked copolymers

According to the similar procedures to Examples 1–4, the cross-linked polymers were produced from mixtures of DCP and 5-norbornenyl-5'-norbornenylcarboxylate as shown in Table 2 below. Table 2 also shows the polymerization time and softening point measured by TMA of each copolymers.

TABLE 2

| | Example No. | | |
|---|---|---|---|
| | 5 | 6 | 7 |
| Monomers in the mixed monomer solutions (mole %) | | | |
| DCP | 90 | 80 | 70 |
| 5-norbornenyl-5'-norbornenylcarboxylate | 10 | 20 | 30 |
| Initial temp. when mixed (°C.) | 32 | 32 | 32 |
| Polymerization time reaching 100° C. (sec.) | 32 | 37 | 44 |
| TMA softening point (°C.) | 140 | 150 | 156 | articles with highly improved softening points.

Table 2 shows further that the use of 5-norbornenyl-5'-norbornenylcarboxylate with DCP moderates the metathesis polymerization reaction and prolongs the polymerization time. This means that 5-norbornenyl-5'norbornenylcarboxylate makes the molding process more easy.

Example 8

54 g Of nadic anhydride, 100 g of 5-hydroxymethylnorbornene and 5 g of pyridine were charged into a 500 ml reaction vessel and then were reacted at 170° C. for 8 hours. The product was extracted by ether and then purified by passing through alumina column. 74 g Of purified bis[(5-norbornenyl)methyl]nadicate was produced. It was identified by IR, NMR and Mass-spectrogram.

According to the similar procedures to Examples 1–4, there were prepared Solutions A and B, each of which contained 5 mole % of said bis[(5-norbornenyl)-methyl]nadicate and 95 mole % of DCP. Cross-linked molded articles were produced by mixing Solutions A and B at 32° C. in the same manners as Examples 1–4. The polymerization time measured was 42 sec. This means that bis[(5-norbornenyl)methyl]nadicate moderates the metathesis polymerization. The molded articles had an improved softening point of 123° C. measured by TMA.

What we claim is:

1. A metathesis polymerized cross-linked copolymer comprising:
   (a) 50–99 mole % of repeating units derived from at least one of metathesis polymerizable cyclic compounds containing at least 30 mole %, based on total moles of the metathesis polymerizable cyclic compounds, of dicyclopentadiene, and
   (b) 50–1 mole % of repeating units derived from at least one of carboxylic acid esters of which the acid residue and alcohol residue have individually at least one norbornene-moiety.

2. A copolymer of claim 1 in which the metathesis polymerizable cyclic compounds (a) contain at least 50 mole % of dicyclopentadiene.

3. A copolymer of claim 1 in which the content of the repeating units (a) is 65–97 mole % and the content of the repeating units (b) is 35–3 mole %.

4. A copolymer of claim 1 in which the ester compounds (b) are (5-norbornenyl)methyl-5'-norbornenylcarboxylate, 5-norbornenyl-5'-norbornenylcarboxylate, (5-norbornenyl)methyl-5'-(5'-methylnorbornenyl)carboxylate and bis[(5-norbornenyl)]-nadicate.

5. A process for producing a cross-linked copolymer, which comprises metathesis polymerizing, in the presence of a metathesis polymerization catalyst system, a mixture comprising:
   (a) 50–99 mole % of at least one of metathesis polymerizable cyclic compounds containing at least 30 mole %, based on total moles of the metathesis polymerizable cyclic compounds, of dicyclopentadiene, and
   (b) 50–1 mole % of at least one of carboxylic acid esters of which the acid residue and alcohol residue have individually at least one norbornene-moiety.

6. A process of claim 5 in which the metathesis polymerizable cyclic compounds (a) contain at least 50 mole % of dicyclopentadiene.

7. A process of claim 5 in which the mixture comprises 65–97 mole % of the cyclic compounds (a) and 35–3 mole % of the carboxylic acid esters (b).

8. A process of claim 5 in which the carboxylic acid esters (b) are (5-norbornenyl)methyl-5'-norbornenylcarboxylate, 5-norbornenyl-5'-norbornenylcarboxylate, (5-norbornenyl)methyl-5'-(5'-methylnorbornenyl)carboxylate and bis[(5-norbornenyl)]-nadicate.

9. A process for producing a molded article by introducing a reactive liquid mixture comprising metathesis polymerizable monomers and a metathesis polymerization catalyst system into a mold in which said liquid mixture is metathesis polymerized in bulk to produce the molded article, said metathesis polymerizable monomers comprising:
   (a) 50–99 mole % of at least one of metathesis polymerizable cyclic compounds containing at least 30 mole %, based on total moles of the metathesis polymerizable cyclic compounds, of dicyclopentadiene, and
   (b) 50–1 mole % of at least one of carboxylic acid esters of which the acid residue and alcohol residue have individually at least one norbornene-moiety.

10. A process of claim 9 in which the metathesis polymerizable cyclic compounds (a) contain at least 50 mole % of dicyclopentadiene.

11. A process of claim 9 in which the mixture comprises 65–97 mole % of the cyclic compounds (a) and 35–3 mole % of the carboxylic acid esters (b).

12. A process of claim 9 in which the carboxylic acid esters (b) are (5-norbornenyl)methyl-5'-norbornenylcarboxylate, 5-norbornenyl-5'-norbornenylcarboxylate, (5-norbornenyl)methyl-5'-(5'-methylnorbornenyl)carboxylate and bis[(5-norbornenyl)]-nadicate.

13. A molded article produced by the process of claim 9.

14. A multi-part polymerizable composition comprising metathesis polymerizable monomers and a metathesis polymerization catalyst system, said metathesis polymerizable monomers comprising:
   (a) 50–99 mole % of at least one of metathesis polymerizable cyclic compounds containing at least 30 mole %, based on total moles of the metathesis polymerizable cyclic compounds, of dicyclopentadiene, and (b) 50-1 mole % of at least one of carboxylic acid esters of which the acid residue and alcohol residue have individually at least one norbornene-moiety, said metathesis polymerization catalyst system comprising a catalyst component and an activator component which are not present in the same part.

15. A composition of claim 14 in which the cyclic compounds (a) contain at least 50 mole % of dicyclopentadiene.

16. A composition of claim 14 in which said metathesis polymerizable monomers comprise 65–97 mole % of the cyclic compounds (a) and 35–3 mole % of the carboxylic acid esters (b).

17. A composition of claim 14 in which the carboxylic acid esters (b) are (5-norbornenyl)methyl-5'-norbornenylcarboxylate, 5-norbornenyl-5'-norbornenylcarboxylate, (5-norbornenyl)methyl-5'-(5'-methylnorbornenyl)carboxylate and bis[(5-norbornenyl)]-nadicate.

* * * * *

UNITED STATES PATENT AND TRADEMARK OFFICE
CERTIFICATE OF CORRECTION

PATENT NO. : 4,923,943

DATED : MAY 8, 1990

INVENTOR(S) : Shigeyoshi Hara and Zen-ichiro Endo

It is certified that error appears in the above-identified patent and that said Letters Patent is hereby corrected as shown below:

Printed Patent Column 11, line 25;

"articles with highly improved softening points."

should read

-- Table 2 shows that the copolymerization of DCP with relatively small amount of 5-norbornenyl-5'-norbornenylcarboxylate provides the polymers and molded articles with highly improved softening points. --

Signed and Sealed this

Tenth Day of December, 1991

Attest:

HARRY F. MANBECK, JR.

*Attesting Officer*  *Commissioner of Patents and Trademarks*